United States Patent
Clabburn

Patent Number: 6,123,877
Date of Patent: Sep. 26, 2000

[54] ASYMMETRIC LIGHT DIFFUSING MATERIAL

[75] Inventor: Robin Clabburn, Sevenhampton, United Kingdom

[73] Assignee: Nashua Corporation, Nashua, N.H.

[21] Appl. No.: 08/956,239

[22] Filed: Oct. 22, 1997

Related U.S. Application Data

[63] Continuation-in-part of application No. 08/579,439, Dec. 27, 1995, abandoned.

[30] Foreign Application Priority Data

| Dec. 28, 1994 | [GB] | United Kingdom | 9426292 |
| Jan. 4, 1995 | [GB] | United Kingdom | 9500025 |
| Oct. 16, 1995 | [GB] | United Kingdom | 9521103 |

[51] Int. Cl.$^7$ .................................................. B29D 11/00
[52] U.S. Cl. ................. 264/1.34; 264/1.36; 264/1.38; 264/2.7; 264/288.4; 264/289.3; 264/290.2
[58] Field of Search ............................. 264/1.34, 1.38, 264/2.7, 1.1, 1.36, 1.35, 288.4, 289.3, 290.2

[56] References Cited

U.S. PATENT DOCUMENTS

| 3,580,661 | 5/1971 | Cooper | 350/128 |
| 4,206,969 | 6/1980 | Cobb et al. | 350/126 |
| 4,232,939 | 11/1980 | Kikuchi | 350/129 |
| 4,273,857 | 6/1981 | Leberzammer | 430/281 |
| 4,321,320 | 3/1982 | Romano | 430/290 |
| 4,340,275 | 7/1982 | Henkes | 350/128 |
| 4,372,639 | 2/1983 | Johnson | 350/3.7 |
| 4,479,105 | 10/1984 | Banes | 337/4 |
| 4,586,780 | 5/1986 | Chern et al. | 350/3.7 |
| 4,586,781 | 5/1986 | Gunther et al. | 350/3.7 |
| 4,983,013 | 1/1991 | Yamamoto | 350/126 |
| 5,040,870 | 8/1991 | Ohno et al. | |
| 5,040,961 | 8/1991 | Hamblen et al. | 425/6 |
| 5,066,572 | 11/1991 | O'Connor et al. | 430/503 |
| 5,122,441 | 6/1992 | Lawton et al. | 430/320 |
| 5,188,777 | 2/1993 | Joesten et al. | 264/41 |
| 5,210,641 | 5/1993 | Lewis | 359/448 |
| 5,237,004 | 8/1993 | Wu et al. | 525/85 |
| 5,245,454 | 9/1993 | Blonder | 359/70 |
| 5,275,854 | 1/1994 | Maier et al. | 428/36.5 |
| 5,279,689 | 1/1994 | Shvartsman | 156/220 |
| 5,307,205 | 4/1994 | Ludwig, Jr. et al. | 359/453 |
| 5,318,737 | 6/1994 | Trabert et al. | 264/171 |
| 5,346,954 | 9/1994 | Wu et al. | 525/85 |
| 5,349,503 | 9/1994 | Blonder et al. | 362/31 |
| 5,442,482 | 8/1995 | Johnson et al. | 359/619 |
| 5,473,454 | 12/1995 | Blanchard | 359/69 |
| 5,932,342 | 8/1999 | Zeira et al. | 264/1.38 |

FOREIGN PATENT DOCUMENTS

| 0 294 122 A1 | 12/1988 | European Pat. Off. |
| 0 311 189 A1 | 4/1989 | European Pat. Off. |
| 0 324 482 | 7/1989 | European Pat. Off. |
| 0 464 499 A2 | 1/1992 | European Pat. Off. |
| 0 464 499 A2 | 5/1992 | European Pat. Off. |
| 0 617 299 A1 | 9/1994 | European Pat. Off. |
| 1 266 832 | 12/1961 | France |
| 59-143618 | 8/1984 | Japan |
| 5-113606 | 10/1991 | Japan |
| 91/18304 | 11/1991 | WIPO |

OTHER PUBLICATIONS

Week 9323, Derwent Publications Ltd., London, GB; AN 93–185565 and JP–A–5 113 606 (Sumitomo Chem. Co.) May 7, 1993, "Reflective Screen for reduced light scattering in vertical direction–comprises anisotropic light scattering material, e.g., polystyrene spherical uniform dispersion in polyethylene transparent matrix of differing refractive index," (ABSTRACT).

"Light Diffuser With Controlled Divergence", *IBM Technical Disclosure Bulletin*, vol. 29, No. 1:276–279 (Jun. 1986).

*Primary Examiner*—Mathieu D. Vargot
*Attorney, Agent, or Firm*—Testa, Hurwitz & Thibeault, LLP

[57] ABSTRACT

Screens having unique optical properties are produced according to the invention by crosslinking and stretching, or otherwise deforming, a sheet of light-diffusing material having symmetrical light diffusion characteristics under conditions sufficient to induce asymmetry. Screens made from the asymmetric light diffusing materials described herein exhibit enhanced brightness and clarity. Utilizing the present methods, optical materials having a desired view angle or improved optical characteristics can be achieved.

20 Claims, 3 Drawing Sheets

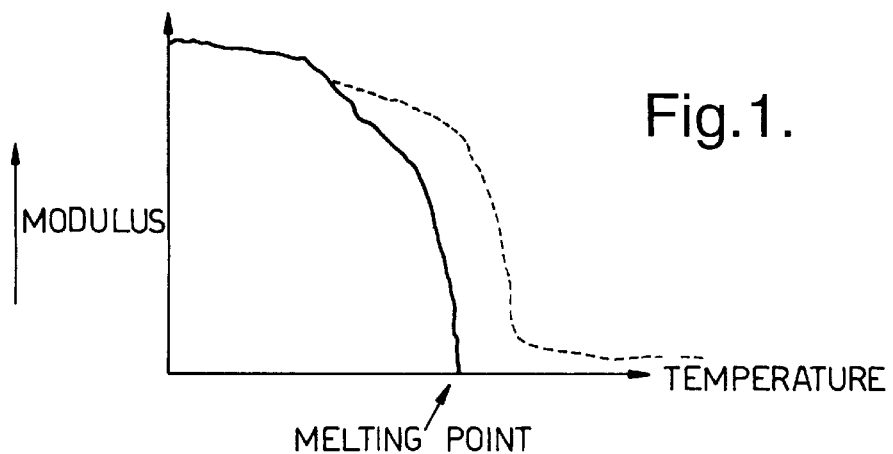
Fig.1.
Fig.2.
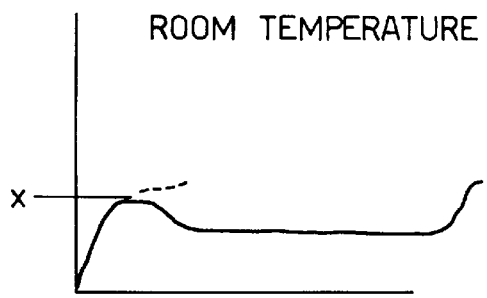
Fig.3.
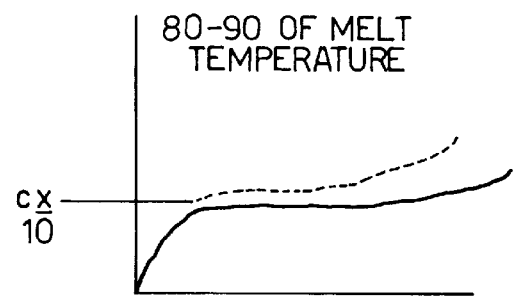
Fig.4.
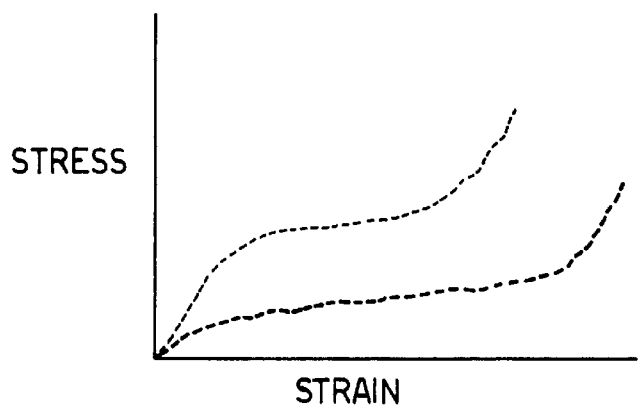

ASYMMETRIC LIGHT DIFFUSING MATERIAL

CROSS-REFERENCE TO RELATED APPLICATIONS

This is a continuation-in-part application claiming priority to U.S. patent application Ser. No. 08/579,439 filed on Dec. 27, 1995, now abandoned, which itself claims priority to Great Britain patent application Serial Nos.: 9521103.3, filed Oct. 16, 1995; 9500025.3, filed Jan. 4, 1995; and 9426292.0, filed Dec. 28, 1994, all of which are incorporated herein by reference.

FIELD OF THE INVENTION

The present invention relates to light-diffusing sheet material such as may be used, for example, in front or rear projection screens.

BACKGROUND

Projection screens are used in optical display devices to diffuse and/or transmit light which is projected onto the screen from behind the screen (rear projection) or from in front of the screen (front projection) to form an image on the screen. Conventional screens used for front or rear projection typically have completely symmetrical diffusion characteristics, that is, the screen will transmit or reflect light in a symmetrical pattern in all directions. A screen's ability to transmit or reflect light is often referred to as one of the screen's optical characteristics.

European Patent No. 0294122 discloses a display system including a projection screen comprising an integral shape of a transparent photopolymer comprising an array of graded refractive index lenses, each of these lenses being formed by a respective region of the sheet extending between the surfaces of the sheet with the refractive index, in each said region, varying gradually with radial distance from the optical axis of the respective lens. A diffusion screen manufactured in accordance with EP 294122 has completely symmetrical diffusion characteristics. Given uniform illumination of an element of the diffusing sheet material by a parallel beam striking the rear surface of such element, the intensity of the light directed by the screen from said element along an axis inclined at an angle α to the normal to the element, measured in a plane perpendicular to the plane of that element will be the same whatever such perpendicular plane is selected. Thus, where a diffusing screen having completely symmetrical diffusion characteristics is used as a rear projection screen lying in a substantially vertical plane, and light is projected normally onto the diffusing screen, the light from the screen will be spread just as much horizontally as vertically.

Japanese Patent Application No. 5-113606 describes a process for making reflective screens having anisotropic light-diffusing properties by extruding through a die a liquid blend of phase incompatible resins thereby forming a film having elliptical light-diffusing particles embedded therein. Uniaxial drawing processing is said to convert these particles to ellipsoidal form with their major axes in the drawing direction.

It is an object of the present invention to provide screen materials having "asymmetrical" diffusion characteristics, that is, the screen diffuses and/or transmits light at a greater intensity in one direction than in another. For example, an asymmetric screen would spread light from the screen horizontally to a substantial extent, but would spread such light much less in a vertical direction.

SUMMARY OF THE INVENTION

According to the invention, there is provided a method of changing the optical characteristics of a light-diffusing sheet material and optical materials produced by the methods. In its most general aspect, the method comprises providing a light-diffusing sheet material which is deformable at least at some temperature and stretching the material preferentially along an axis in the plane of the sheet material, under conditions sufficient to change its optical characteristics. In a preferred aspect, the invention provides methods for producing a light-diffusing sheet material having asymmetric light-diffusing properties, and optical materials produced by the methods. Generally, the methods comprise providing a light-diffusing sheet material which is deformable at least at some temperature and stretching the material preferentially along an axis in the plane of the sheet material, under conditions sufficient to induce asymmetry.

The method may be applied to any polymeric sheet material typically used to manufacture light-diffusing screens. Such polymeric materials include, for example, polyalkyl acrylates, polyethylene, polypropylene, polyvinyl acetate or derivatives thereof, polyesters, polycellulose acetate butyrate, polyvinyl butyrate and copolymers of these. For use as optical materials, these polymeric sheets are manufactured or treated to have light diffusion characteristics by creating arrays of "microlenses" having a different refractive index than the base polymer sheet. This can be achieved, for example, by exposing a sheet of polymeric material to UV or other radiation in selected areas, thereby causing formation of areas in the polymer having a different refractive index than the base or matrix polymer. A mask often is used to ensure that only desired portions of the material are exposed. Another method for forming microlenses is to disperse in the polymer matrix particles having a different refractive index than the polymer, and then forming the sheet by conventional techniques such as extrusion or casting. Another method which may be used to form light-diffusing sheets is to create surface irregularities on the surface of the sheet. In some instances, a specific light-diffusing film may incorporate a combination of these methods, but may also incorporate other optical features or properties such as polarization birefringence or reflection reducing coatings.

Materials useful in the present invention include photopolymers of the type described in U.S. Pat. Nos. 5,279,689, U.S. Pat. No. 4,321,320, U.S. Pat. No. 4,273,857, U.S. Pat. No. 4,479,105 and EP Patent Specification EP 0324482, assigned to DuPont DeNemours and Company ("DuPont"). One type of material useful in the present invention is available from DuPont under the tradename OMNIDEX. These materials are not initially light-diffusing, but can be rendered light-diffusing by exposing them preferentially to an appropriate pattern of polarizing light, for example, as described in European patent Number 294122. OMNIDEX materials having the type designation HRF150 or HRF600 are particularly useful. The monomer in the HRF series photopolymers is N-vinyl-carbazole (NVC) dispersed in plasticized polyvinyl acetate (PVAC), cellulose acetate butyrate (CAB) or polyvinyl butyrate (PVB) as the polymeric binder. The material may be initiated either by photoinitiators or by a photosensitizing dye/initiator combination. The OMNIDEX materials are available in sheet form, comprising a layer of the monomer on a polyester film base (such as MYLAR) the layer being entirely covered with a polyester (such as MYLAR) film. A graded refractive index (GRIN) lens structure can be created within such materials by discrete irradiation, and thus selective polymerization of the contained monomer(s), typically through a suitable mask.

Examples of light-diffusing material useful in the present invention includes that disclosed in International application WO91/18304, which comprises graded refractive index (GRIN) screen material. In GRIN materials, at least one surface of the sheet material has a contouring or relief corresponding to the refractive index gradations, for example comprising a respective convex dome or concave dimple for each graded refractive index lens, aligned with and adding its optical effect to the graded refractive index lens. The method also is applicable to variants of these materials in which each surface relief lens is substantially larger in diameter than the graded refractive index lenses and spans a plurality of these.

Another form of light-diffusing sheet material which can be used to make the present optical materials is disclosed in U.S. Pat. No. 5,307,205. This material comprises a bilayer sheet constructed of a first supporting polymeric material, and a second layer comprising a polymeric matrix of a first transparent or light transmitting material, for example, polymethylmethacrylate, in which is embedded a plurality of small, substantially spherical particles of a second light transmitting plastic material having a different refractive index, for example, an alkyl acrylate resin. Materials comprising a matrix having a first refractive index and having dispersed therein particles having a second refractive index are commercially available from Minnesota Mining and Manufacturing Company and from Rohm & Haas Co. under the tradename "Plexiglas L." A preferred combination of sheet materials which can be used comprises a polymeric matrix having embedded therein spherical particles of light transmitting material which are more resistant to crosslinking by radiation than the material or materials which comprise the polymeric matrix. One example of such a combination is a plurality of small, substantially spherical particles of polystyrene embedded in a polyolefin matrix. The currently preferred polyolefin is polypropylene, but polyethylene, or similar ethylene polymers or co-polymers may also be used. Other combinations which would produce similar results can be ascertained by those skilled in the art.

Other light-diffusing sheet materials which can be used include those in which some or all of the diffusing effect is attributable to surface contouring or irregularity. Such irregularities may, for example, take the form of an array of minute part-spherical dome regions on the surface of the material, or may comprise a less regular structure. Asymmetric diffusion characteristics may be induced in such sheet material by heating it to a softening temperature and stretching preferentially along an axis in the plane of the material. Where the material has a surface configuration comprising an array of part-spherical domed regions, these are distorted by such stretching into oval or elliptical regions.

The embedded particles, surface contouring or other surface relief effects which provide the light-diffusing properties preferably are in the range up 50 microns in diameter, more preferably up to about 10 microns.

In a preferred embodiment of the present method, a sample of such light-diffusing sheet material, having initially symmetric diffusion characteristics, can be converted into a material having asymmetric diffusion characteristics by stretching the material along an axis in the plane of the material. The material optionally may be heated to a temperature at which it is slightly softened prior to stretching. The material then is allowed to cool in its stretched condition. Without wishing to be bound by theory, it is believed that the asymmetry is the result of a distortion of the individual particles, and/or from the microspheres adjacent the surface of the material distorting during stretching, providing an asymmetric effect.

In the following description, reference is made to the "angle of view." As used herein, the term "angle of view" refers to the range of viewing angles of observers relative to such a diffusing front or rear projection screen over which the apparent brightness of the screen is within 50% or more of the maximum apparent brightness to an observer viewing the screen typically at right angles to its central point.

BRIEF DESCRIPTION OF THE FIGURES

The invention is pointed out with particularity in the appended claims. The advantages of this invention described above, as well as further advantages of this invention, may be better understood by reference to the following description taken in conjunction with the accompanying drawings, in which:

FIG. 1 is an example of a graph of modulus of elasticity against temperature for both crosslinked and non-crosslinked versions of essentially the same material; in this instance, certain types of polyethylene. Different thermoplastics may have significantly different overall properties, but the effects of crosslinking are generally similar.

FIG. 2 is a graph of stress versus strain for both materials shown in FIG. 1 at room temperature.

FIG. 3 is a graph (corresponding to FIGS. 1 and 2) showing respective curves for the crosslinked and non-crosslinked polyethylene material at a temperature close to the melting point of the non-crosslinked material.

FIG. 4 is a graph corresponding to FIG. 3 for two crosslinked counterparts to the non-crosslinked material of the other graphs, with different crosslink densities, at a temperature above the melting point of the corresponding non-crosslinked material.

DETAILED DESCRIPTION OF THE INVENTION

Figure 5:
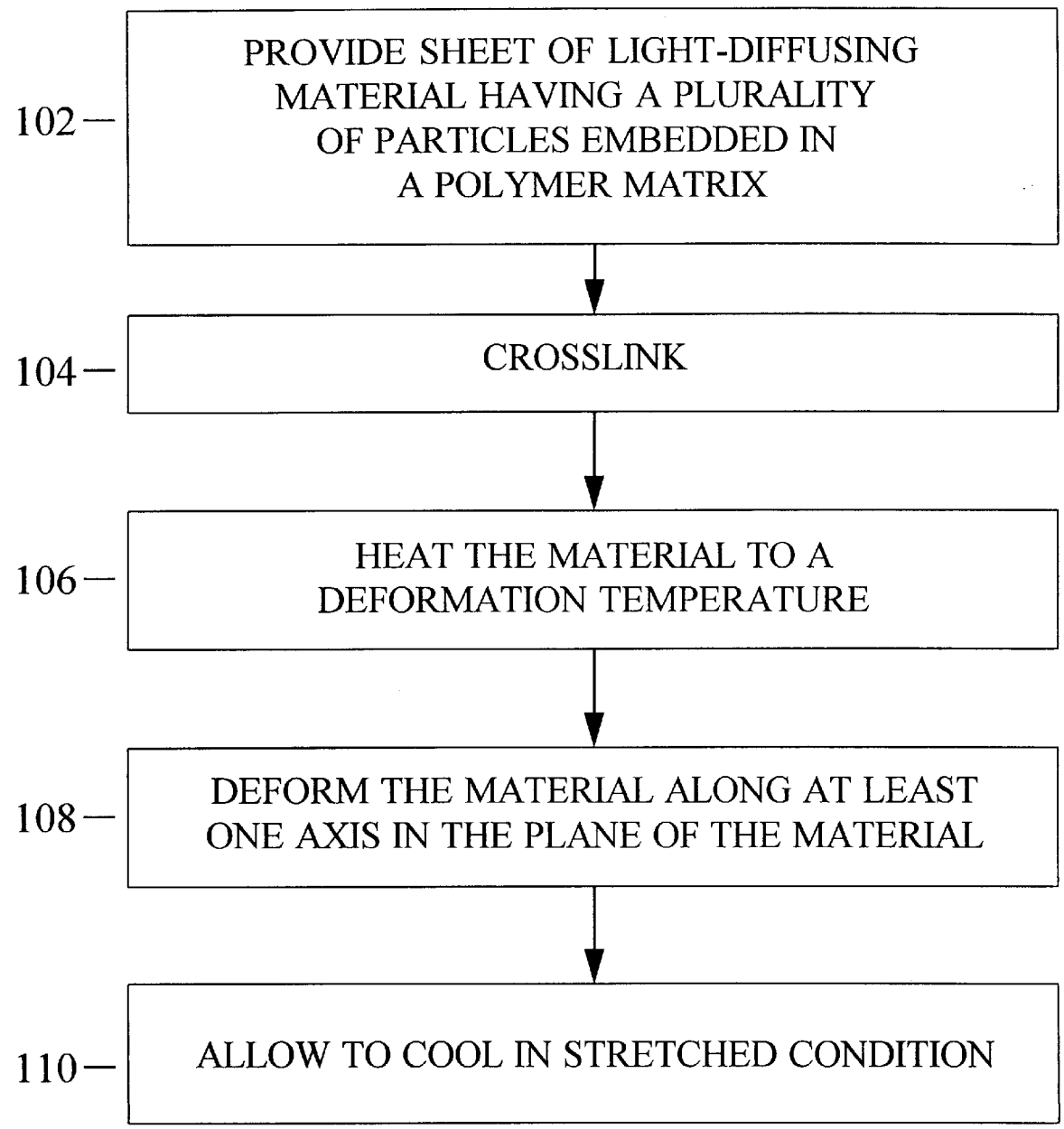
FIG. 5 is a flowchart of steps to be taken to change the optical characteristics of a sheet of light-diffusing material having a plurality of particles embedded in a polymeric matrix.

In accordance with the invention, it has been found that a sample of sheet material of the above noted kind and having, initially, symmetrical diffusion characteristics, can be converted into a material having asymmetric diffusion characteristics by stretching the sheet material linearly in a direction in its own plane. Preferably, the material is heated to a temperature at which it is slightly softened, before stretching. The material then is allowed to cool in its stretched condition so that the stretch remains permanent. It is believed that the effect of the stretching is to elongate each of the microlenses along the direction of stretching, and thus perpendicular to its optical axis so that each lens is rendered astigmatic.

The method of the invention preferably may be applied to light-diffusing sheet materials, such as those disclosed in WO91/18304 in which at least one surface of the sheet material has a contouring or relief corresponding to the refractive index gradations. The method also is applicable to variants of these materials in which each surface relief lens is substantially larger in diameter than the graded refractive index lenses and spans a plurality of these.

A type of light-diffusing sheet material which may also be used to make the present asymmetric screens comprises a matrix of a first transparent or light transmitting plastic material, for example, polymethylmethacrylate, in which is embedded a plurality of small, substantially spherical particles or microspheres of a second light transmitting plastic material having a different refractive index, for example, an ethyl acrylate or butyl acrylate resin. The particles of different refractive index embedded in the matrix may be rigid at room temperature but may soften, so as to be deformable or stretchable at the temperature to which the matrix material is heated for stretching. It has been found that such sheet material, having initially symmetric diffusion characteristics, can be converted into a material having asymmetric diffusion characteristics by heating the material to a temperature at which it is slightly softened, stretching the material along an axis within the plane of the material, and allowing the material to cool in its stretched condition. It is believed that, in this instance, that the asymmetry is the result of a distortion of the individual (initially spherical) particles, and/or from the microspheres adjacent the surface of the material distorting that surface during stretching, This results in an asymmetric surface relief effect, for example, forming a respective asymmetric dome above each such particle adjacent said surface.

Diffusing sheet materials also can be used in which some or all of the diffusing effect is attributable to surface contouring or irregularity. These irregularities may, for example, take the form of an array of minute part-spherical dome regions on the surface of the material, or may comprise a less regular structure. In accordance with the method of the invention, asymmetric diffusion characteristics may be induced in such sheet material by heating to a softening temperature and stretching preferentially along an axis in the plane of the material. Where the material has a surface configuration comprising an array of part-spherical domed regions, these are distorted, by such stretching, into oval or elliptical regions.

It has also been found that, when a diffusing material, such as that described in U.S. Pat. No. 5,307,205 is stretched according to the present invention the stretching appears to produce a net increase in the extent to which the diffuser "spreads" the light. That is the stretching results in an increase in the apparent brightness of a screen element, (illuminated by a beam normal to the plane of the element), as viewed along a line making a substantial angle with respect to the normal to the element. Stated another way, the stretching increases the "angle of view." Accordingly, using the method of the invention, it is possible to produce an increase in this "spreading" effect without departing from the symmetry of light diffusion by stretching the material at elevated temperature simultaneously in two mutually perpendicular directions in its plane. The material is maintained in its stretched condition which being allowed to cool so that the asymmetry induced by stretching in the material remains permanent. This effect is reproducible in the other forms of diffusing material described herein.

There are a number of ways of stretching or orienting sheet polymer materials which will be known to those skilled in the art, who should have no difficulty in selecting appropriate techniques applicable to any particular diffusing material. Orientation of polymer materials typically, but not always, takes place at a temperature which is above the normal use temperature, and below the temperature at which the material becomes fluid. The orientation process may take place as part of the basic fabrication process, for example, the orientation of polymer fiber following extrusion, or subsequently, for example, during vacuum forming of articles from a previously fabricated sheet. Methods of orienting plastics may be uniaxial (for example with fibers) or biaxial (for example with sheet or film), and the range of techniques available is well known to those skilled in the art.

In a preferred embodiment of the present invention, heating is used prior to and/or during orientation to induce asymmetry and to achieve specific changes in angle of view in polymeric light-diffusing material. Heating is not necessary in all cases, and there will be instances in which orientation will take place at room temperature, and even at temperatures below room temperature. However, heating and ensuring that the correct temperature profile is maintained during the stretching process, can achieve preferred results. The temperature range selected typically will depend upon the polymeric composition of the sheet material. As stated above, the temperature selected will be above the normal use temperature for the polymer sheet, and below its melting temperature. The temperature selected preferably will be the temperature at which the sheet material can be stretched uniformly to achieve the desired effect. For most sheet polymers, the temperature at which stretching takes place, typically will be in the range of from about 70 to about 150° C. For example, for polyalkylacrylate polymers, the optimum stretching temperature is likely to be in the range of from about 80° C. to about 120° C.

The orientation or stretching step can be carried out using a number of methods. Basically, there are two types of orientation processes which are preferred for use in the present invention: first, in which the material is compressed, and second, in which the material is stretched, e.g., mechanically or using air pressure, in one or more directions. Typically in a compression process, a sheet of material is run through the nip of a two or multi-roll stack. The nip separation is less than the thickness of the material. In the process, the thickness is reduced and the length increased (almost in proportion). The increase in width is small, but it will increase with the increase in temperature. For best results, a temperature difference is established between the roll stack and the material as it enters the roll stack. If more than one pair of cooperating rolls is used there will typically be a change in the temperature of the material from one pair of rolls to the next (and successive pairs of rolls may be maintained at different temperatures).

Deformation of the sheet of material may occur any direction. "Casting," as the term is used herein, will mean such well known processes as blow molding, vacuum forming and blown-film methods, which deform a sheet of material in such a way as to conform or contour the material to the surface of a substrate. These methods all involve cooling during the stretching part of the process.

As used herein, the terms "stretching" or "orienting" mean applying tension to the material along one or more axes in the plane of the sheet material by any means. Such stretching need not be produced by pulling the material, but may, for example, be produced by extrusion, compression, by passing the material through a nip between rollers, or by any other method commonly known in the art.

The currently preferred method for orienting sheet material, particularly where the starting material is either sheet or roll stock, uses an apparatus which has three heating zones: a preheating zone where the material is heated before significant deformation takes place; a subsequent stretching zone where the material also may be heated, and, optionally, a subsequent annealing zone. Providing that stretching is complete in the stretching zone, annealing may not be necessary. In this process, material can be stretched longitudinally, laterally or in both directions. Longitudinal stretching is achieved by differential roll speeds within the machine. Lateral stretching is achieved by gripping the material at discrete points then moving the grippers apart. In some machines the grippers are run in diverging rails and are connected by chains. In these, the orientation (stretching) is purely lateral. Similarly, rail separation and rate of separation can be varied. Equipment for stretching or orienting the materials as described herein is available from a variety of manufacturers, for example, from Kampf, and the principles are well understood within the plastics processing art.

In the context of this invention, the most appropriate method will be chosen based on the starting material, for example, whether it is crosslinked and thus non-melting, as is often the case with photopolymer based material, or is thermoplastic as described in U.S. Pat. No. 5,307,205. The parameters selected also may depend upon the change in character required, that is, whether it is desired to create asymmetric optical characteristics, whether it is desired to change the angle of view, or a combination of these two. For example, orientation in a single direction will create asymmetry. Orientation in two directions may or may not create asymmetry, dependent on the degree of orientation, but will change the view angle. In heterogeneous materials such as those described in U.S. Pat. No. 5,307,205, where optical properties are achieved by mixing two or more materials, the effects of orientation will be determined by the separate physical characteristics of these materials. This is best understood by considering relatively hard particles contained in an originally smooth surfaced sheet. As stretching takes place, these particles tend to increasingly modify the surface of the sheet. If the particles are originally spherical, convex "bumps" will be created on the surface of the sheet, forming surface relief lenses. In this process, the spheres are extended in the direction of orientation and somewhat flattened as a result of the thinning process. Control of these two factors contributes to the asymmetry produced. By the correct choice of material and process temperature, the relative physical properties of the component materials in mixed systems can be chosen to enable specific surface relief and/or asymmetry characteristics to be achieved. Use of a crosslinked matrix material may improve process flexibility by increasing the range of temperatures at which a process may be carried out and by increasing the number of materials which may be used.

In a further embodiment, the invention utilizes a crosslinked thermoplastic sheet material. Crosslinking of thermoplastic materials is now a relatively well known technology. When thermoplastics are crosslinked, they no longer melt when heated but exhibit elastic or elastomeric characteristics above the melting point of the corresponding non-crosslinked polymer. When the crosslinked polymer is heated to above the melting point of the corresponding non-crosslinked polymer, stretched, then cooled, the crosslinked material will retain its stretched configuration until reheated. When reheated, the crosslinked material tends to return to its original dimensions. Crosslinking thus provides considerable flexibility in the orientation of polymer materials, and in the case of materials otherwise as described above, makes it easier to obtain a predetermined degree of asymmetry. FIGS. 1 to 4 illustrate the modification of the physical properties of a thermoplastic material (polyethylene in the example illustrated) by crosslinking. In these Figures, the graphs relating to the non-crosslinked material are in solid lines and the graphs relating to the crosslinked material are in dotted lines.

FIG. 1 shows that crosslinking the polymeric material, in this case polyethylene, increases the range of temperatures at which deformation may occur. This means that a crosslinked sheet of light diffusing material may be stretched over a broader range of temperatures than a non-crosslinked sheet of light-diffusing material. FIGS. 2 and 3 show the stress-strain behavior of both non-crosslinked and crosslinked materials at room temperature (FIG. 2) and at temperatures near the melting point (FIG. 3). It can be seen from FIG. 2 that at room temperature, the non-crosslinked material no longer stretches uniformly above stress x, however, crosslinked material will continue to deform uniformly at this temperature. FIGS. 2 and 3 in combination indicate that crosslinking increases the range at which uniform deformation of the polymer may occur.

FIG. 4 shown the stress-strain curve for the same polymer with two different degrees (or densities) of crosslinking. The data indicates a greater degree of mechanical strength is attained with a greater degree of crosslinking. It can be appreciated from the above that the greater the material strength of the matrix, the greater the distortion of any embedded particles may be achieved.

Non-crosslinked materials, when orientated at elevated temperatures by any of the techniques disclosed above, must be cooled during stretching to ensure that the thinning areas (which cool more quickly) build up mechanical strength, thus ensuring that the thicker (hotter) areas become appropriately stretched. This principle is utilized in the "blown film" process most commonly used for making plastic bags. A given thermoplastic material will have an optimum (maximum) degree of orientation. Levels below the optimum are very difficult to obtain by heating and stretching, specifically, if a uniform product is required. In some instances, the only effective approach is to use a "nip roll" process in which the material is compressed to induce thickness reduction and thus orientation.

Similar constraints do not exist with cross-linked thermoplastics. For these, a stretching process at high temperature can achieve a range of orientation levels within the elongation capabilities of the material.

Cross-linking may be achieved by several techniques. The more common are high energy radiation, e.g., by electron beams or X rays, UV radiation or by chemical treatments, for example, using peroxides. The degree of crosslinking can be readily controlled, and this can be true of both the host polymer and the material of the embedded particles. Since both temperature and crosslink density affect the elastic modulus of the polymer structure on a microscopic level, crosslinked thermoplastic materials can provide great flexibility in the creation of asymmetric diffusers of the type outlined above.

Crosslinked thermoplastics typically have improved thermal characteristics relative to the corresponding non-crosslinked material. Controlled crosslinking of the matrix will eliminate the need for melting or near-melting of the material prior to stretching, and will provide much greater flexibility in the choice of stretching temperature. That means that crosslinking of the matrix allows the light-diffusing material to be stretched over a broader range of temperatures than non-crosslinked material. Since a crosslinked matrix material may stretched over a broader reange of temperatures, a broader range of materials may be dispersed in the matrix. Also, since the crosslinked matrix material has increased mechanical strength, the crosslinked matrix is capable of deforming a broader range of materials than the mechanically weaker non-crosslinked matrix. Controlled crosslinking also eliminates the need for cooling during stretching. Crosslinking may be effected before, during and after stretching. Crosslinking before stretching provides flexibility in stretching temperature and the mechanical strength of the polymer matrix. Crosslinking after stretching will tend to "lock in" the orientation effected by stretching. It is currently preferred to crosslink before stretching the light-diffusing material. In an alternative embodiment, the light-diffusing material is crosslinked after the stretching step. In yet another embodiment, the sheet is crosslinked both before and after the stretching step. This second crosslinking step may occur before and/or after the material has cooled in its stretched position. The ultimate objective of crosslinking the matrix before stretching is to increase the mechanical strength of the matrix such that the sheet may be stretched over a wider range of temperatures and to allow a broader range of materials that can be dispersed and eventually deformed in the matrix.

In reference to FIG. 5, in a preferred embodiment of the present invention, a sheet of light-diffusing material is provided having a plurality of particles embedded in a polymer matrix (step 102). The embedded particles are preferably substantially spherical. The sheet of light-diffusing material is crosslinked (step 104), heated to a deformation temperature (step 106), stretched along at least one axis in the plane of the sheet of material (step 108), and then allowed to cool in its stretched condition (step 110).

Figure 6:
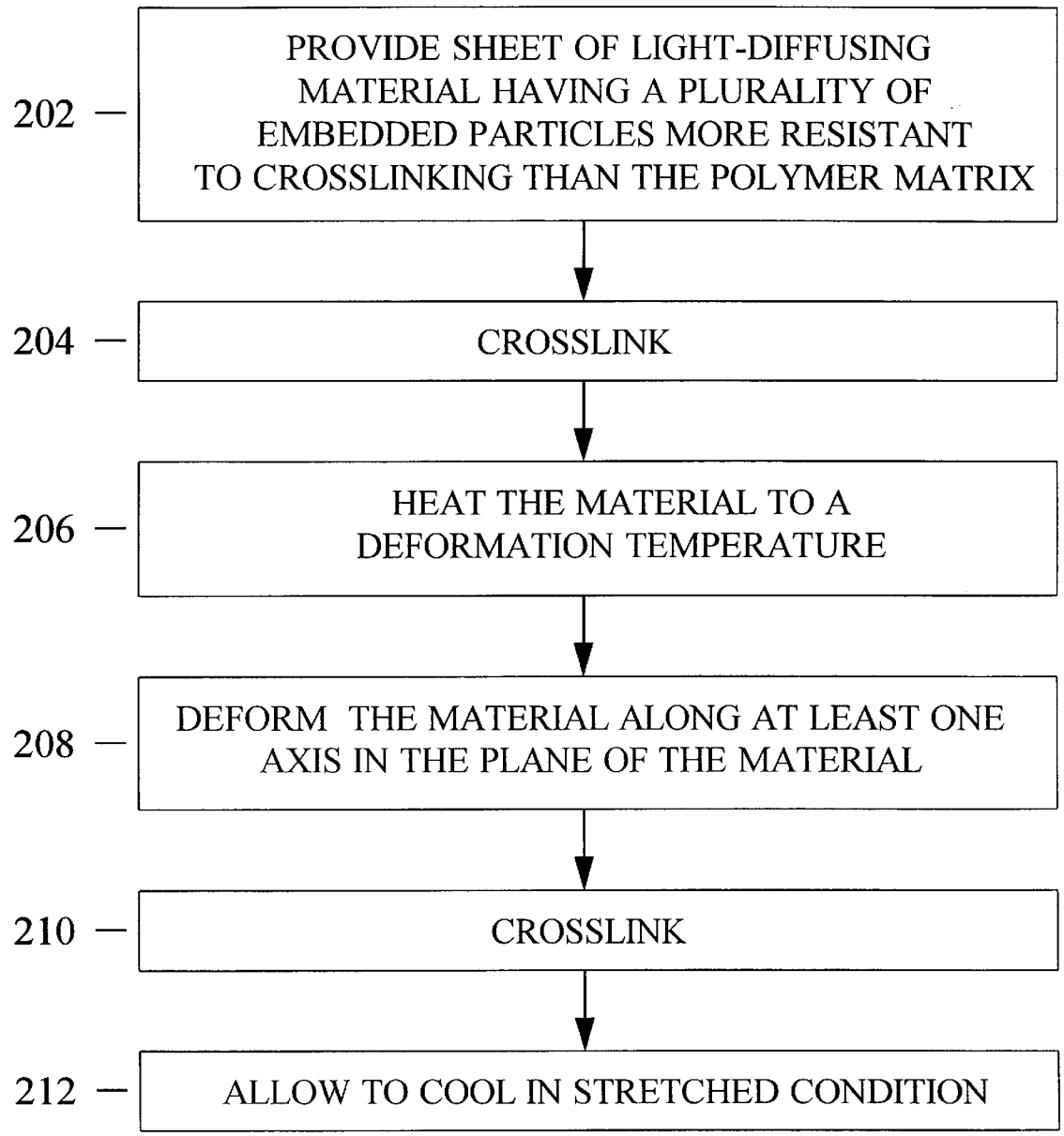
FIG. 6 is a flowchart of the steps to be taken to change the optical characteristics of a sheet of light-diffusing material having a plurality of embedded particles in a polymer matrix, wherein the embedded particles are more resistant to crosslinking than the polymer matrix.

FIG. 6 shows a more preferred embodiment of the present invention. A sheet of light-diffusing material is provided having a plurality of embedded particles which are more resistant to crosslinking than the polymer matrix (step 202). These embedded particles are also preferably substantially spherical. The sheet of light-diffusing material is crosslinked (step 204) and heated to a deformation temperature (step 206). The sheet of light-diffusing material is then stretched along at least one axis in the plane of the sheet (step 208), and subsequently crosslinked to "lock in" the orientation effected (step 210). The sheet of light-diffusing material is then allowed to cool in its stretched position (step 212).

This combination of materials and method produces asymmetry superior to those obtained with traditional methods apparently because when the material is crosslinked prior to stretching (FIG. 5, step 104, FIG. 6, step 204), the matrix increases in mechanical strength while the crosslinking of the embedded particles is less pronounced. Accordingly, when the material is stretched (FIG. 5, step 108, FIG. 6, step 208), the matrix, which has increased mechanical strength due to crosslinking, is more capable of deforming the dispersed phase, which has not been crosslinked or has been crosslinked only to small degree. Optionally, as shown in FIG. 6, step 210, if the sheet is again crosslinked after stretching, the asymmetry effected may "locked in."

When crosslinking is used to increase the asymmetry achieved, it is preferred that the embedded polymeric material is chosen to be more resistant to crosslinking, or have a slower rate of crosslinking, than the matrix material. For example, a currently preferred choice of materials is polystyrene for the embedded material and polypropylene for the matrix material. Polypropylene can be readily crosslinked in a nitrogen atmosphere as opposed to polystyrene, which is relatively radiation-resistant due to its ring structure. Crosslinkability of various materials is well-known in the art, and various combinations of particle and matrix materials may be used so long as a higher degree of crosslinking is ultimately achieved in the matrix than in the particles.

Although the description above has been directed to materials comprising a matrix of one plastic material incorporating particles of another material of different refractive index, a similar crosslinking technique can be applied to the photopolymer-based graded refractive index screen material referred to above. The photopolymer-based graded refractive index material described above already may be crosslinked to some extent as a result of selective UV exposure used to produce the graded refractive index lenses or other graded refractive index features. However, as a means of optimizing the orientation process, further crosslinking may be deliberately induced. The preferred photopolymerizable material incorporates crosslinkable components such as PVA. Any such component of the photopolymer could be further polymerized, for example, using electron beam irradiation, which could change the orientation and asymmetry characteristics of the material without significantly affecting the fundamental diffusion characteristics, such as angle of view.

As regards the embodiments described above where a thermoplastic material has light-diffusing characteristics which are due to surface relief characteristics or features, variants of such embodiments are possible where the material is crosslinked before, during or after stretching or other orientation.

Depending on the application, the techniques described herein may be used to create asymmetry, modify the angle of view, or both. Using these techniques, it is possible to change the optical characteristics in a single sheet of material and vary the properties within that sheet. For example, vacuum forming a flat sheet of the material into a hemisphere, or a more complex shape, will give a variety of orientations, and thus view angle differences, within a single piece.

With some diffusing materials, stretching the material actually appears to reduce, rather increase the angle of view. This effect, also, is considered to be within the scope of the invention.

It will be understood that any of the diffusing materials referred to above may be used as a rear projection screen, i.e., as a diffusing transmission screen, or may be laminated or coated with a reflective layer to form a reflective or front projection screen. The reflective layer may be applied after stretching, where the reflective layer is non-stretchable, or before stretching if the reflective layer is stretchable without detriment to its reflective properties. Methods for applying reflective layers on screen materials are well known, and do not form a part of this invention. Generally, reflective screens of the present invention can be produced by depositing or laminating a layer of reflective material on one surface of the screen. For example, a reflective screen can be made by laminating the screen material with reflective Mylar® or with a metallized film. Reflective screens also can be made by direct metallization of the screen material using well established techniques.

It is possible to incorporate further properties in a light-diffusing screen in accordance with the invention. for example, such a screen may incorporate a reflection reducing coating or coatings, or may have additives or treatment to render the screen birefringent or polarizing.

Preferred embodiments of the present invention are exemplified below.

EXAMPLE 1

Light-diffusing film DFA12 provided by the 3M Company (Minnesota, Mining and Manufacturing Company, St. Paul Minn.) having a viewing angle of 20° (50% of peak brightness) in all directions was stretched at 80° C., causing a reduction in thickness of about 20% (from 0.0065 in to 0.0055 in). The stretched material was cooled to room temperature and the view angle was re-measured. After orientation, the angles of view were 26° in the direction of orientation and 22° in the direction perpendicular to the direction of orientation. This example demonstrates that asymmetry was created and the angle of view changed.

EXAMPLE 2

A light-diffusing photopolymerized sheet material was produced as described in European Patent No. 294122 and as follows using DuPont HRF600 photopolymer with an inert Mylar backing, and an original thickness of 93 microns. The photopolymer was laminated to a photographic mask containing a large number of small apertures randomly placed and then exposed to UV light to achieve selective polymerization. The mask was then removed and the entire area of photopolymer was subjected to a second UV exposure which completed the polymerization process and crosslinked the matrix. This light-diffusing material had symmetric optical characteristics and an angle of view of 46°. A sample of this material 45 mm in width (and stripped from its Mylar backing) was then preheated to 130° C., at which temperature the material became slightly softened, then stretched longitudinally to a ratio of 2:1 (i.e., was stretched to twice its original length) and cooled in its stretched condition so that the stretch remained permanent. After stretching the width had reduced to 25 mm. When examined for optical properties, the stretched material was found to be asymmetric, having an angle of view of 37° in a plane parallel with the longitudinal direction of the strip, and an angle of view of 47° in a plane perpendicular to the direction of the stretch.

EXAMPLE 3

The table below sets out the results obtained by applying the method of Example 2 to further light-diffusing sheet plastics materials, stretched by Marshall & Williams Corporation using run designations MW11, MW13, MW2, MW3 and MW6. The material used to produce these sheets was Plex-L from Attohaas. Plex-L material consists of crosslinked acrylic spheres about 10 $\mu$m in diameter dispersed a thermoplastic acrylic matrix with an initial thickness of 20 thousandths of an inch (500 $\mu$m). The results are shown in Table 1. The stretching temperatures, stretch ratios and final sheet thickness being as indicated in the columns heated "S. Temp.", "S. Ratio" and "FT" respectively. The headings "A of V (vert)" and "A of V (hor)" refer to the angles of view (as hereinbefore defined) respectively in a longitudinal plane parallel with the stretch direction and in a plane perpendicular to the stretch direction. The heading "Gain" refers to the ratio of the apparent brightness of the screen, illuminated normally, when viewed normally, to the average apparent brightness (averaged over a full solid angle of 180°). Temperatures in the table are in °C. and thickness is expressed in thousandths of an inch. Angles of view are in degrees.

TABLE 1

| Material | S. Temp | S. Ratio | A of V (hor) | A of V (vert) | Gain | FT |
|---|---|---|---|---|---|---|
| MW11 | 102 | 2.00 | 35 | 17.5 | 11.09 | 13.5 |
| MW13 | 107 | 2.00 | 37 | 19 | 11.70 | 14.5 |
| MW2 | 102 | 1.25 | 34.5 | 25 | 8.39 | 17.5 |
| MW3 | 102 | 1.58 | 31 | 19.5 | 12.05 | 14 |
| MW6 | 104 | 1.71 | 29.5 | 19 | 12.98 | 13.5 |

Prior to stretching, the material had horizontal and vertical angles of view of about 37 and 35.5 degrees, respectively and gain of 5.89.

EXAMPLE 4

Pellets of Escorene polypropylene PP9524 and Huntsman crystal polystyrene 207 in the ratio of 70:30 were fed to a 40 mm extruder fitted with a cavity transfer mixture and 8" slot die. The cavity transfer mixer had 9 vanes. The extruder operating at about 180° C. dispersed the polystyrene as small generally spherical particles with a mean particle size of 5 $\mu$m. A sheet about 0.5 mm thick was extruded and cooled. The optical properties of this film were measured. The horizontal and vertical angles of view were 120° and 116° respectively. The sheet was then crosslinked by irradiation in a nitrogen atmosphere using 15 Mrad of $\gamma$ (gamma) radiation from a cobalt source. Following this the sheet was heated to 160° C., stretched in a ratio of 2:1, then cooled to room temperature and the optical properties remeasured. The horizontal and vertical angles of view were 106° and 41° respectively. This experiment was repeated but with a stretch ratio of 3.6:1. The horizontal and vertical angles of view were 103° and 22° respectively. These results demonstrate that the use of a matrix that is easily crosslinked with radiation in combination with embedded particles which are radiation resistant results in asymmetry superior to that obtained for example in Examples 3 wherein the embedded sphere materials are crosslinked.

EXAMPLE 5

The experiment of example 3 was repeated to compare the asymmetry effected by stretching with and without crosslinking as well as the asymmetry effected when the sheet is cooled to room temperature immediately versus when the sheet is held stretched for 2 minutes at 150° C., then cooled to room temperature (annealed). The procedure of example 3 was followed using Plex-L material and exposing only half of the samples to 10 Mrad of $\gamma$ (gamma) radiation, and then half again of each set was annealed by heating the samples to 150° C. for two minutes and allowing the samples to relax, and then cool to room temperature. The resulting vertical and horizontal angles of view are shown in Table 2. These results demonstrate improvements in the thermal stability of crosslinked samples.

TABLE 2

| | | | Annealed 150° C. | | Not Annealed | |
|---|---|---|---|---|---|---|
| Material | S. Temp | S. Ratio | A of V (hor) | A of V (vert) | A of V (hor) | A of V (vert) |
| Not Crosslinked | 120° C. | 3.6 | 41 | 42 | 35 | 20 |
| Crosslinked | 120° C. | 3.6 | 37 | 34 | 35 | 20 |

While the invention has been particularly shown and described with reference to specific preferred embodiments, it should be understood by those skilled in the art that various changes in form and detail may be made without departing from the spirit and scope of the invention as defined by the appended claims.

What is claimed is:

1. A method of changing the optical characteristics of a sheet of light-diffusing material comprising the steps of:
    (a) providing a sheet of light-diffusing material comprising a polymeric matrix and defined regions having refractive indices different from that of the polymeric matrix;
    (b) cross-linking said sheet of light-diffusing material;
    (c) heating the sheet of light-diffusing material to a deformation temperature to provide a heated sheet of light-diffusing material;
    (d) stretching the heated sheet of light-diffusing material along at least one axis in the plane of the sheet of light-diffusing material under conditions sufficient to induce deformation of the defined regions of differing refractive indices thereby providing a stretched sheet of light-diffusing material; and
    (e) permitting the stretched sheet of light-diffusing material to cool in its stretched condition.

2. The method of claim 1 wherein step (a) comprises providing a sheet of light-diffusing material comprising a polymeric matrix and an array of graded refractive index features.

3. The method of claim 1 wherein step (a) comprises fabricating a sheet of light-diffusing material comprising a polymeric matrix and an array of graded refractive index features, wherein said array of graded refractive index features are formed by selectively crosslinking the sheet of light-diffusing material.

4. The method of claim 1 wherein step (a) comprises providing a sheet of light-diffusing material comprising a plurality of particles embedded in a polymeric matrix, wherein the plurality of particles are defined regions having refractive indices different from that of the polymeric matrix.

5. The method of claim 1 wherein step (a) comprises providing a sheet of light-diffusing material comprising a plurality of substantially spherical particles embedded in a polymeric matrix, wherein the plurality of substantially spherical particles are defined regions having refractive indices different from that of the polymeric matrix.

6. The method of claim 1 wherein step (a) comprises providing a sheet of light-diffusing material comprising a plurality of particles embedded in a polymeric matrix, wherein the plurality of particles are resistant to crosslinking relative to the polymeric matrix, and the plurality of particles are defined regions having refractive indices different from that of the polymeric matrix.

7. The method of claim 1 wherein step (a) comprises providing a sheet of light-diffusing material comprising a plurality of particles embedded in a polymeric matrix, wherein the sheet of light-diffusing material has at least one textured surface, and the plurality of particles are defined regions having refractive indices different from that of the polymeric matrix.

8. The method of claim 1 wherein step (d) further comprises crosslinking and stretching the heated sheet of light-diffusing material along at least one axis in the plane of the sheet material under conditions sufficient to induce deformation of the defined regions of differing refractive indices, thereby providing a stretched sheet of light-diffusing material.

9. The method of claim 1 further comprising the step of crosslinking the sheet of light-diffusing material subsequent to step (d).

10. The method of claim 1 wherein step (b) comprises crosslinking the sheet of light-diffusing material by exposing the sheet of light-diffusing material to ultraviolet radiation.

11. The method of claim 1 wherein step (b) comprises crosslinking the sheet of light diffusing material by contacting the sheet of light-diffusing material with a chemical crosslinking agent.

12. The method of claim 1 wherein step (b) comprises crosslinking the sheet of light-diffusing material by exposing the sheet of light-diffusing material to ionizing radiation.

13. The method of claim 1 wherein step (d) comprises stretching the heated sheet of light-diffusing material along two axes in the plane of the sheet of light-diffusing material under conditions sufficient to induce deformation of the defined regions having differing refractive indices thereby providing a stretched sheet of light-diffusing material.

14. A method of changing the optical characteristics of a sheet of light-diffusing material comprising the steps of:
    (a) providing a sheet of light-diffusing material comprising a plurality of polystyrene particles embedded in a polyolefin matrix;
    (b) cross-linking said sheet of light-diffusing material by exposing the sheet of light-diffusing material to ultraviolet radiation;
    (c) heating the sheet of light-diffusing material to a deformation temperature to provide a heated sheet of light-diffusing material;
    (d) stretching the heated sheet of light-diffusing material along at least one axis in the plane of the sheet of light-diffusing material under conditions sufficient to induce deformation of the the plurality of polystyrene particles thereby providing a stretched sheet of light-diffusing material; and
    (e) permitting the stretched sheet of light-diffusing material to cool in its stretched condition.

15. The method of claim 14 wherein step (a) comprises providing a sheet of light-diffusing material comprising a plurality of substantially spherical polystyrene particles embedded in a polypropylene matrix.

16. The method of claim 14 wherein step (a) comprises providing a sheet of light-diffusing material comprising a plurality of substantially spherical polystyrene particles embedded in a polypropylene matrix, wherein the sheet of light-diffusing material has at least one textured surface.

17. The method of claim 14 wherein step (d) comprises crosslinking and stretching the heated sheet of light-diffusing material along at least one axis in the plane of the sheet of light-diffusing material under conditions sufficient to induce deformation of the plurality of polystyrene particles thereby providing a stretched sheet of light-diffusing material.

18. The method of claim 14 further comprising the step of crosslinking the sheet of light-diffusing material subsequent to step (d).

19. The method of claim 14 wherein step (d) comprises stretching the heated sheet of light-diffusing material along two axes in the plane of the sheet of light-diffusing material under conditions sufficient to induce deformation of the plurality of polystyrene particles thereby providing a stretched sheet of light-diffusing material.

20. The method of claim 1 wherein step (d) comprises stretching the heated sheet of light-diffusing material by casting the heated sheet of light-diffusing material onto a substrate under conditions to induce deformation of the defined regions of differing refractive indices thereby providing a stretched sheet of light-diffusing material.

* * * * *